United States Patent [19]

Omi

[11] 3,997,258
[45] Dec. 14, 1976

[54] FILM READER

[75] Inventor: Kokichi Omi, Chofu, Japan

[73] Assignee: Canon Kabushiki Kaisha, Tokyo, Japan

[22] Filed: Feb. 13, 1975

[21] Appl. No.: 549,767

[30] Foreign Application Priority Data

Feb. 20, 1974 Japan .............................. 49-20280
Jan. 14, 1975 Japan ................................ 50-6692

[52] U.S. Cl. .................................. 353/79; 353/77; 353/27 R
[51] Int. Cl.² .................... G03B 21/24; G03B 23/08
[58] Field of Search .................... 353/79, 20, 25–27, 353/38, 39, 64, 119, 70, 71, 84, 82, 83; 350/315, 9, 38, 37, 276 A, 276 R, 283, 124; 352/104, 129; 312/258; 220/4 F, 6

[56] References Cited

UNITED STATES PATENTS

| | | |
|---|---|---|
| 2,170,967 | 8/1939 | Eppenstein et al. ................ 353/39 |
| 2,734,435 | 2/1956 | Leonardi ........................... 350/315 |
| 3,479,116 | 11/1969 | Anderson ............................ 353/77 |
| 3,744,893 | 7/1973 | Chandler .......................... 353/84 X |
| 3,809,460 | 5/1974 | Letten et al. ......................... 353/39 |

Primary Examiner—Richard E. Aegerter
Assistant Examiner—Larry Jones
Attorney, Agent, or Firm—Fitzpatrick, Cella, Harper & Scinto

[57] ABSTRACT

A film reader include a lower casing accommodating a light source and an optical illuminator, and an upper casing enclosing a reflection type screen, the upper casing being collapsible and having an opening for observing the reflection type screen. A filter is disposed in the opening. One end of the filter is pivotably mounted to the upper casing and the other end of the filter is detachably mounted.

15 Claims, 8 Drawing Figures

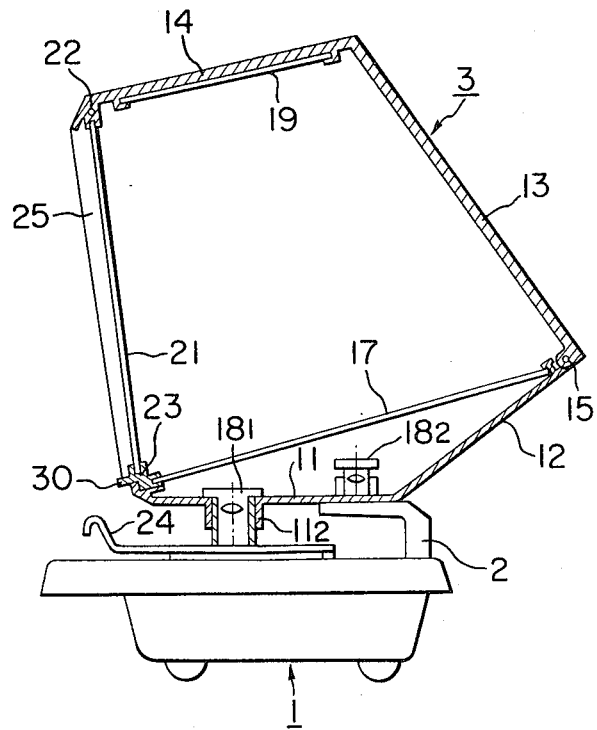
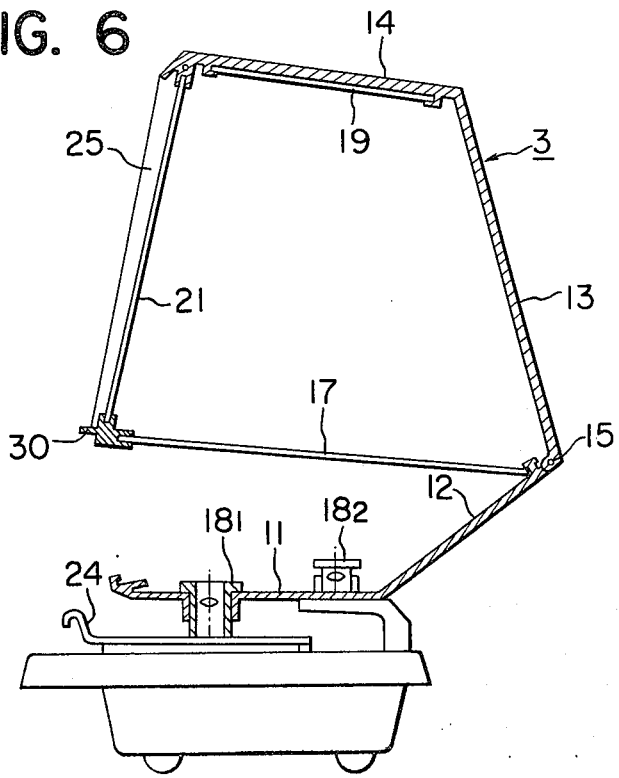

FILM READER

BACKGROUND OF THE INVENTION

1. Field of the Invention

This invention relates to a film reader, and more particularly to a portable film reader for observing the film images projected on a reflection type screen.

Microfilm is a recording medium for recording a document, drawing or other object on a highly reduced scale, and for reading the recorded image in the film, such recorded image is projected in an enlarged form on a screen and observed by a film reader. Therefore, the overall size of the film reader unit is decided depending on the extent to which the images recorded reducedly on the film are enlarged. Generally, in case of enlarging and reading a reduced image recorded on the microfilm, it is convenient for easy and quick observation to project the image by enlarging it substantially to the original size of the object or to a size about 20 or so percent greater than the original (real-life) size, regardless of the rate of reduction of the image. Thus, the value of magnification of the enlarged and projected image is decided by the rate of reduction of the image on the film, and hence it may be said that the size of the film reader unit is determined according to the size and type of the object which is photographed in the film on a reduced scale.

Also, in the conventional film readers, a reflector alone is disposed in the light path from the projection lens to the screen on which the image is projected, and hence a large space is left in the reader unit. Therefore, a film reader using a microfilm having photographed therein a large-sized object is large in its external dimensions for its weight, and hence the entire reader assembly is enlarged in size to make it incommodious to carry about. Also, the expenses for packing and transportation run up and a large space is required for storage.

2. Description of the Prior Art

Generally, the film readers may be classified into two types according to the observation system employed. One is the "transmission" type in which an image is projected on the back of a so-called transmission type screen formed by spreading a diffusing paint on one side of a glass-made or transparent acrylic resin made plate, and the transmitted light is observed on the front side of the screen; and the other is the "reflection" type in which an image is projected on a so-called reflection type screen same as a movie screen and the reflected light is observed.

The former type, however, has drawbacks that the transmissivity is low owing to the diffusing paint, the picture is dark, the diffusivity is poor so that it is hard to read the periphery of the picture unless the viewer moves the position of his eyes, and also the picture glitters. But this type has advantages that good image contrast is obtained and also the image projected face of the screen is proof against intrusion of dust or other alien matters and also safe from cuts or other damage as the back side of the screen is hermetically shielded.

On the other hand, the latter type is free of the said defects of the former type, such as dark picture, poor diffusivity and glittering of the picture, and the picture is easy to read. This type, however, has the problem that the image projected face of the screen could gather dust or other alien matters and be damaged by intrusion of such alien matters as the front side of the screen is open.

SUMMARY OF THE INVENTION

The present invention is intended to provide a film reader which is free of all of the above-said defects of the conventional types of readers and which can be reduced into a compact size when it is transported or not used, that is, it is portable with ease or packed in a small size for easy transportation, and which also permits easy reading of the image so that the viewer suffers little fatigue of his eyes even if he keeps on reading the image for a long time.

The film reader provided according to the present invention comprises a lower casing housing an illumination light source and an optical system for illumination, and an upper casing housing a reflector and a reflection type screen and supported on said lower casing. A filter is swingably disposed at the opening of the upper casing for facilitating observation of the reflected image of the film projected on said screen, and at least a part of the upper casing is arranged foldable.

BRIEF DESCRIPTION OF THE DRAWINGS

FIG. 5 is a sectional view showing another embodiment of the film reader according to the present invention;

FIG. 6 is a view similar to FIG. 5 but showing a condition where a part of the upper casing of the film reader has been raised up:

DESCRIPTION OF THE PREFERRED EMBODIMENTS

Now the present invention will be described in detail by way of some preferred embodiments thereof as illustrated in the accompanying drawings.

Figure 1:
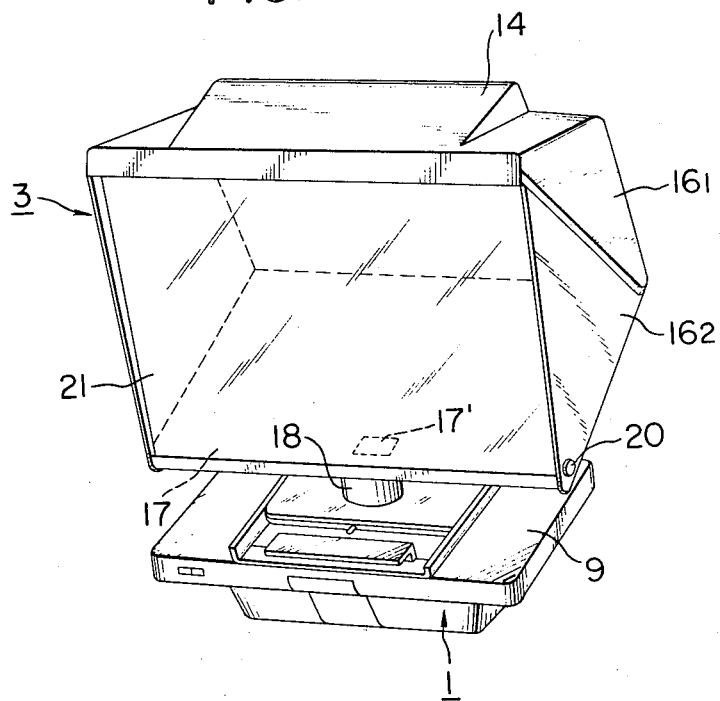
FIG. 1 is a general perspective view showing one embodiment of the film reader according to the present invention in a condition of use.
Figure 3:
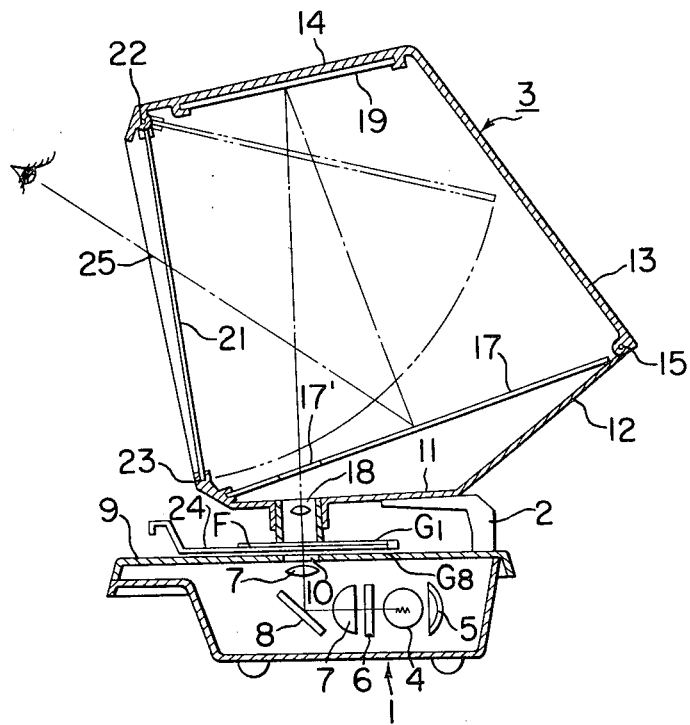
FIG. 3 is a sectional view of the device shown in FIG. 1.

Referring first to FIGS. 1 and 3, it will be seen that the film reader unit of the present invention comprises a hollow lower casing 1 and a box-shaped upper casing 3 which is supported on said lower casing by a leg 2. The lower casing 1 houses an illumination lamp 4, a spherical reflection mirror 5, a heat insulating glass 6, a condensing lens 7, and a reflector 8. The light from the illumination lamp 4 is reflected toward an aperture 10 formed in the top wall 9 of the lower casing 1. The upper casing 3 consists of a bottom wall 11 secured to the leg 2, a slanted rear wall 12 integral with said bottom wall 11, an upwardly extending rear wall 13, a top wall 14 integral with said rear wall 13, a short side wall $16_1$ and a flexible side wall $16_2$. This upper casing is shaped like a hollow box opened at its front side, forming a hood. The rear wall 13 is swingably secured to the rear wall 12 by a pivot 15. The rear wall 12 extends obliquely from the bottom wall 11, and a reflection type screen 17 formed with a light transmitting hole 17' is provided aslant across said bottom wall 11 and rear wall 12.

The screen 17 is inclined at an angle of about 20° so as to facilitate observation of the reflected light on the screen from the open side of the reader. Said screen is made by pasting a white paper with rough surface on a base plate.

The projection lens 18 which projects the image in the film is disposed in the bottom wall 11 in alignment with the aperture 10 in the lower casing and with the light transmitting hole 17' in the reflection type screen and functions to adjust the focus. A reflection mirror 19 adapted to receive the image light from said projection lens 18 is secured to the top wall 14 opposite to the reflection type screen 17 so as to reflect the image light from said projection lens 18 toward the screen 17. The side wall $16_2$, as shown in FIG. 1, is triangle-shaped and made of a flexible material such as rubber or soft vinyl chloride resin. One side of said side wall is secured to the corresponding side of the short side wall $16_1$, and a latch member 20 engageable with a corresponding mating member on the bottom wall 11 of the upper casing is provided at the meeting end of the other two sides. The inside of each wall of the upper casing 3 is black-colored so as to prevent reflection within the casing.

An optical filter 21 is disposed in the opening 25 formed in the front side of the upper casing 3 by its respective walls for facilitating observation of the image projected on the reflection type screen. The top end of said filter 21 is swingably hinged at 22 to the top wall 14 of the upper casing, while the lower end of said filter is detachably fitted in a U-shaped recess 23 provided in the bottom wall 11, so that when this filter is fitted in said recess 23 and thereby set in position, the integral walls 13, 14 are supported by said filter and also the opening 25 at the front of the upper casing is closed by the filter. This optical filter 21 is tinted and has a transmissivity best suited for observing the contrast of the image projected on the reflection type screen 17. A film holder 24 is disposed to be movable both longitudinally and laterally on the upper surface of the top wall 9 of the lower casing 1, and a microfiche F having a plurality of recording frames in rows and columns is held between the two transparent glass plates $G_1$ and $G_2$ of said film holder. A specific recording frame can be selected and positioned on the optical axis of the projection lens 18 by suitably moving said film holder 24.

FIGS. 1 and 3 show an assembled unit of the reader of the present invention ready for use. As the lower end of the filter 21 is fitted in the U-shaped recess 23, the top wall 14 integral with the rear wall 13 is supported by the filter 21, and a space for projecting the enlarged image is formed in the upper casing 3 as shown in FIG. 3, allowing the observer to observe the reflected light on the screen 17 through the filter 21. The side wall $16_2$ of the upper casing is fastened to the bottom wall 11 by the latch member 20 (FIG. 1) and the front opening 25 is closed by the filter 21, so that the upper casing is hermetically covered and protected against intrusion of dust or other alien matters and against damage to the component parts in the casing.

Figure 2:
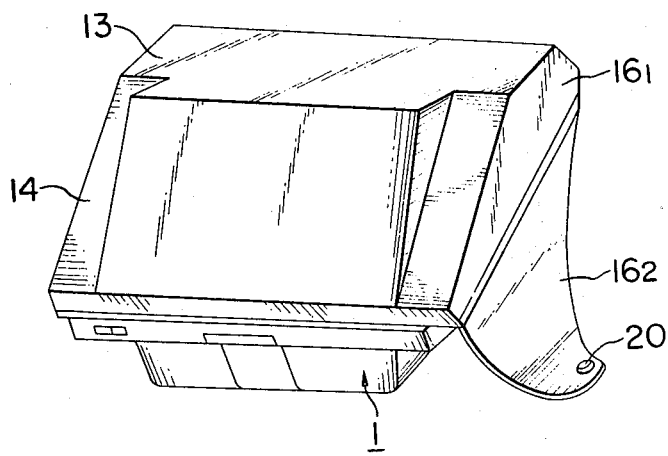
FIG. 2 is a perspective view of the device as it was folded up into a compact non-use size.
Figure 4:
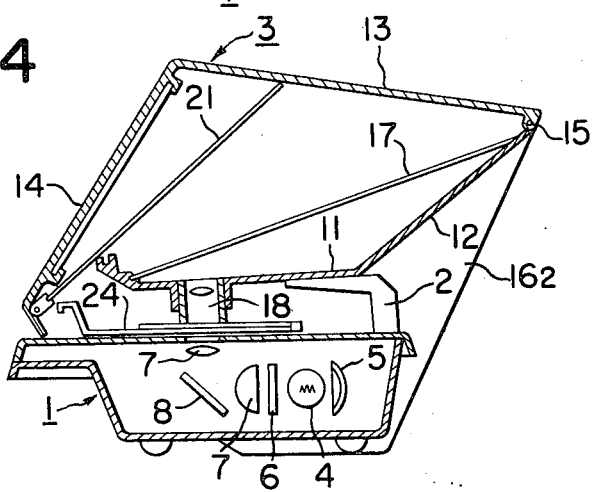
FIG. 4 is a sectional view of the device shown in FIG. 2.

When the reader is transported or not used, the operator disengages the latch member 20 on the side wall $16_2$, then raises up the end of the top wall 14 to remove the filter 21 from the U-shaped recess 23, and then presses the lower end of the filter 21 into the upper casing and turns the filter 21 counterclockwise. The rear wall 13 integral with the top wall 14 is also turned counterclockwise together with the side walls $16_1$, $16_2$ about the pivot 15 and folded up to the position where the end of the top wall 14 is engaged with the top wall 9 of the lower casing as shown in FIGS. 2 and 4. When the reader is thus folded up into a compact unit, the reflection type screen 17, reflection mirror 19, filter 21 and film holder 24 are all covered by the rear wall 13 and top wall 14 and protected against dust or damage during transportation or storage. Since the top end of the filter 21 is swingably hinged so that it covers the reflection mirror 19 when pushed into the casing, there is no possibility that the observer will touch the reflection mirror 19 with his hand, and also cleaning of the screen 17 can be practiced with ease. Also, the side wall of the upper casing is at least partly made of a flexible material, so that even when the side wall hits the ground engaging face of the lower casing 1 when folding up the reader, no trouble arises as said side wall can bend freely.

In the above-described embodiment, the upper casing is bendable only at one part, but it may be arranged such that it is bendable at several parts. For instance, the bottom wall 11 and short rear wall 12 may be joined by hinge means. Also, the side wall $16_2$ may be separatably joined to the bottom wall 11 by using a Magic tape instead of the latch member 20, or the lower edge of the side wall $16_2$ may be secured to the bottom wall 11. In the latter case, the side wall 16 is bent into or outside of the upper casing.

Figure 7:
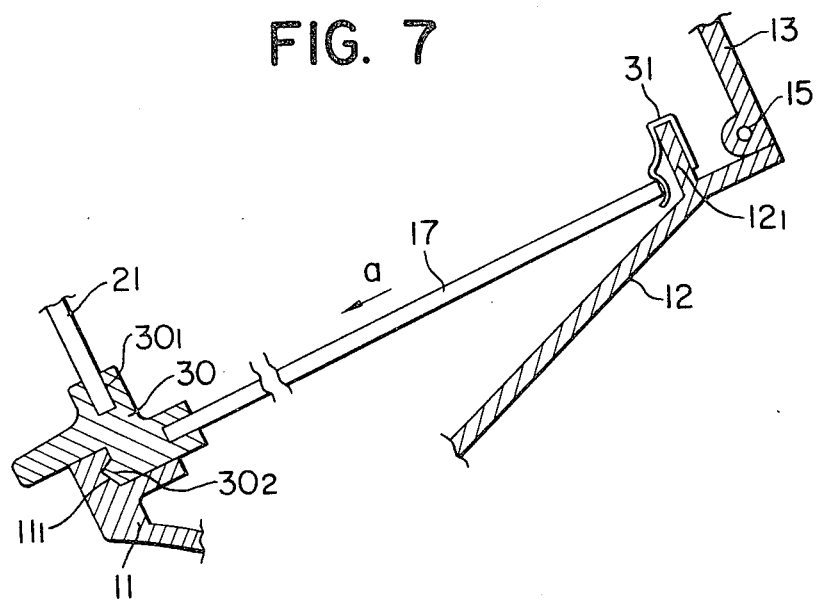
FIG. 7 is an enlarged view of an essential part of the device shown in FIG. 5.

FIG. 5 shows another embodiment of the present invention which is specifically designed to allow easy change of projection magnification. In FIG. 5, same reference numerals are used to designate same elements as those in FIG. 1. In this embodiment, a holder 30 is detachably provided at the front end of the bottom wall 11 of the upper casing. This holder 30, as shown in FIG. 7, has a U-shaped groove $30_1$ for fitting an end of the filter 21 and a jaw $30_2$ designed to fit in a recess $11_1$ formed in the bottom wall 11. One end of the screen 17 fits in said holder 30 while the other end is secured by a leaf spring 31 provided on a protuberance $12_1$ of the rear wall 12. Said leaf spring 31 is adapted to constantly press the screen 17 in the direction of arrow $a$. The selected one (for instance $18_1$) of the projection lenses $18_1$, $18_2$ of different magnifications is inserted into and fixed in an opening $11_2$ formed in the bottom wall 11 while the remaining lens $18_2$ is housed in a space defined by the screen 17, bottom wall 11 and rear wall 12.

Figure 8:
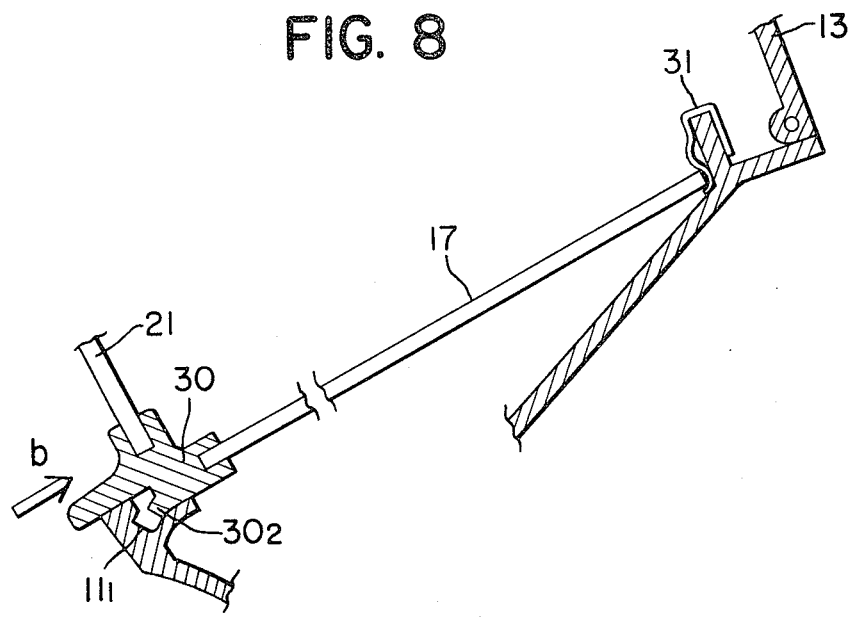
FIG. 8 is a view similar to FIG. 7 but showing a condition where a part of the upper casing of the film reader shown in FIG. 5 has been raised up.

In the foregoing embodiment, when it is desired to exchange the projection lens to change the projection magnification, the operator first pushes an end of the holder with his hand in the direction of arrow $b$ (FIG. 8) to disengage the jaw $30_2$ of the holder from the recession in the bottom wall 11, and then he raises up the holder 30, whereby, as shown in FIG. 6, a part of the upper casing is turned about the pivot 15 and the rear wall 13, top wall 14, side walls $16_1$, $16_2$, screen 17 and filter 21 are raised up all together, with the interior of the bottom wall 11 and rear wall 12 being opened out. Under this condition, the operator can easily exchange the lens.

The reader assembly can be folded down into a compact size by removing the lower end of the filter 21 out of the groove $30_1$ in the holder 30. Each of the projection lenses is provided with a collar at a suitable position so that when a lens is inserted into the opening $11_2$, such lens will be always correctly set the focal point.

I claim:

1. An image observing device comprising:
   a screen;
   a housing containing said screen therewith and also having an observation port, said housing including a fixed portion and a collapsible portion which includes a rear wall pivotably mounted on said fixed portion, a top wall fixed on said rear wall, and opposite side walls fixed on said rear wall and top wall, said collapsible portion being movable between a first position wherein said collapsible portion is away from said screen and a second position wherein said collapsible portion is close to said screen, at least a portion of said side walls being flexible so as to be bent when urged against a surface on which said image observing device is located.

2. An image observing device comprising:
   a frame;
   lifting means detachably mounted on said frame;
   a covering member having a top wall and opposite side walls, at least a portion of which is flexible, said covering member being movable between a first position wherein said screen is observable and a second position wherein said screen is non-observable; and
   a screen having an end supported by said frame and another end supported by said lifting means; and
   filter means having an end pivotably mounted on said cover and another end detachably mounted on said lifting means, said filter means being movable between a first position wherein said filter means is upright relative to said covering member and a second position wherein said filter means is collapsed relative to said covering member;
   said filter means, when placed at the first position, supporting said covering member and providing, between said covering member and said screen, a port through which said screen is observable through said filter means, thereby providing access to the inside of said frame when said lifting means is operated.

3. An image observing device comprising:
   a frame;
   a screen mounted on said frame;
   a hood having a top wall, a rear wall and opposite side walls, said hood being pivotably mounted on said frame;
   filter means movable between a closing position wherein said filter means is away from said frame and an opening position wherein said filter means is close to said frame, said filter means having an end pivotably mounted on said top wall of said hood and another end detachably mounted on said frame;
   said filter means supporting said hood and controlling light entering from the outside of the device into a chamber formed by said hood and said screen, when said filter means is at said opening position, and said filter means being enclosed by said hood, when said filter means is at said closing position.

4. A film reader for observing an image recorded on film, comprising:
   a frame;
   a screen mounted on said frame;
   a movable covering member pivotably mounted on said frame and having a top wall and opposite side walls, at least a portion of which is flexible, said covering member being movable between a first position wherein said screen is observable and a second position wherein said screen in non-observable, said covering member being provided at an inner surface thereof, with a mirror for projecting an image of a film onto said screen; and
   filter means having one end pivotally mounted on said covering member and another end detachably mounted on said frame, said filter means being movable between a first position wherein said filter means is upright relative to said covering member to form a port through which an image of a film can be observed through said filter means and a second position wherein said filter means is collapsed.

5. A film reader according to claim 4, wherein said covering member includes a rear wall fixed to said top wall and said opposite side walls being fixed to said top wall.

6. A film reader for observing an image recorded on film comprising:
   a frame;
   a screen mounted on said frame;
   a covering member pivotably mounted on said frame and having a top wall and opposite side walls, at least a portion of which is flexible, said covering member being movable between a first position wherein said screen is observable and a second position wherein said screen is non-observable; and
   filter means having one end pivotally mounted on said covering member and another end detachably mounted on said frame;
   said filter means, when said covering member is at its first position, being effective to control light entering from the outside of the film reader to a space formed within said covering member by said screen and said covering member, and to support said covering member, and said filter means, when said covering member is at its second position, being disposed within said covering member.

7. A film reader according to claim 6, further comprising means for projecting an image of a film onto said screen, said means being mounted on said covering member and wherein said projecting means includes a mirror fixedly mounted on an inner surface of said covering member.

8. A film reader according to claim 6, further comprising means for detachably mounting said covering member to said frame, when said covering member is at said first position.

9. A film reader according to claim 6, wherein said frame is fixed on a lower housing containing light source means, and said frame, said covering member and said filter means cooperate with one another to form an upper housing, when said covering member is at said first position.

10. A film reader according to claim 9, further comprising lens means mounted on said frame and a film holder disposed between said upper housing and said lower housing.

11. A film reader according to claim 6, wherein said screen is of a reflection type.

12. A film reader according to claim 6, further comprising means for supporting said screen and detachably mounting said filter means, said supporting means being movable between a first position wherein said supporting means engages said frame and a second position wherein said supporting means is away from said frame, said covering member, filter means and screen moving upwardly relatively to said frame when said supporting means moves from the first position thereof to the second position thereof.

13. A film reader according to claim 12, wherein a space for accommodating an interchangeable lens is formed within said frame, said space being open when said supporting member is in the first position thereof.

14. A film reader according to claim 6, wherein the flexible portion of said side walls is of flexible sheet material.

15. A film reader according to claim 6, wherein the flexible portion of said side walls is of flexible material such as rubber or synthetic resin.

* * * * *